United States Patent Office 2,797,593
Patented July 2, 1957

2,797,593

CRANK DISK MECHANISM

Willem Hendrik Braskamp, Voorburg, Netherlands

Application June 22, 1953, Serial No. 363,229

Claims priority, application Netherlands June 24, 1952

4 Claims. (Cl. 74—599)

The invention relates to crank disk mechanism with radially adjustable crank pins, and more particularly to devices for bringing about a rocking motion of a fan about an axis transverse to the fan shaft, the crank pin being supported in a member which is connected with the crank disk so as to be able to rock about an axis outside of the pin.

An object of the invention is to provide a crank disk mechanism of the above mentioned type such that the adjustment of the stroke, i. e., of the eccentricity of the adjustable crank pin, and consequently the magnitude of the angular rotation of the fan, can be controlled without interrupting the drive of the crank disk and without the use of fastening members for the crank pin which have to be disengaged and fastened again.

To achieve this end, the member in which the crank pin is located is, according to the invention, permanently urged in a direction which causes the rocking of the member about its axis and therewith the maintaining of engagement of the crank pin with one of a series of recesses which are arranged in a spiral about the center of a support which normally rotates coaxially with the crank disk, but is rotatable relatively thereto; the said recesses being connected by guide faces in such a way that with a relative rotation of the relatively rotatable parts the crank pin is forced, against the load, out of the recess and—dependent on the magnitude of the angular rotation—caused to engage with one of the following recesses in the series.

According to a further feature of the invention the center of one of the recesses for the crank pin may be provided in the center of the crank disk, in such a way that when the crank pin is in this central recess, the eccentricity is zero, and consequently the fan is stationary as regards rotation about the axis referred to above.

The inventive idea can be realized structurally by fitting the crank pin in a member which is connected with the crank disk so as to be able to rock about an axis outside the pin and is acted upon by a spring in the sense of causing the outward rocking of this member relatively to the circumference of the crank disk, and by forming the recesses for the crank pin, connected by guide faces, in a disk or casing which is connected with the crank disk so as to be coaxially rotatable.

In the structure of the mechanism which comprises the possibility of completely stopping the rocking motion of the fan or other member to be operated, the distance between the centers of the crank pin and the rocking shaft of the rocking member is equal to that between the centers of the crank disk and the rocking shaft center.

Structurally the disk provided with recesses can be embodied as a casing surrounding the crank disk at the circumference. The casing is provided with means for axially locking the parts while allowing relative rotation in such a way that normally this casing is carried along with the crank disk by the crank pin lying in a recess; however the casing, which may for example be knurled for this reason, can readily be seized with the hand and stopped or turned in the opposite sense in order to bring about the relative angular rotation for the adjustment of the crank pin.

The invention will be explained more fully below with reference to the drawings wherein.

Figure 1:
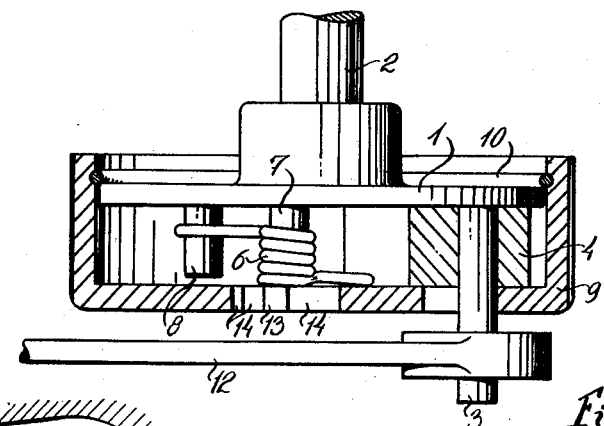
Figure 1 is a transverse cross-section through a crank disk mechanism in accordance with the invention.

The crank disk proper 1 is fitted on a shaft 2, which, when the crank mechanism is used in a fan, is parallel to the shaft about which the fan is to rock and which is continuously driven via a reduction gearing from the fan motor or the fan shaft.

The crank pin 3 of the crank disk mechanism is not fitted in the crank disk, but in a rocking member 4, which has been placed against the lower surface of the crank disk so as to be able to rock about a journal 5 fixed to the disk 1, the distance between the center of the crank disk and the center line of the journal 5 being equal to the distance between said center line and that of the crank pin 3.

Figure 2:
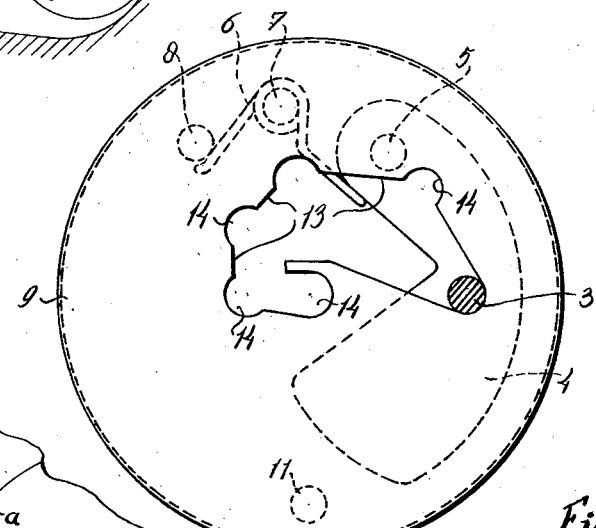
Figure 2 shows a bottom view of the mechanism according to Fig. 1 with omission of the connecting rod.

The rocking member 4 is acted upon by a torsion spring 6, which is wound about a pin 7 of the crank disk 1 and rests with one end against a fixed stop 8 and with the other end against the inside of the rocking member 4, in such a way that it urges the latter in the sense of causing an outward motion of the rocking member relatively to the circumference of the crank disk (see Fig. 2).

The crank disk 1 with the rocking member 4 is surrounded by a dish-shaped casing 9, and is axially locked by an annular spring 10 in a groove of said casing, with such a force, however, that relative rotation of the crank disk and the casing is possible. The pin 7 of the spring 6 and a supporting pin 11 arranged opposite thereto in the bottom of the casing 9 prevent the tilting or rocking about a horizontal axis of the crank disk in the casing.

The crank pin 3 extends outwards through the bottom of the casing 9—with a view to driving the connecting rod 12, which engages one arm of the rocking shaft of the fan—via a specially shaped opening in the bottom. As a matter of fact, this opening is delimited by a succession of straight parts 13 serving as cam faces, which are separated by semi-circular recesses 14 for the pin 3. The recesses are located, in the counterclockwise sense, at successively decreasing radial distances from the center of the crank disk and the casing, the first recess with the greatest distance lying at a radius which is equal to the direct distance between the center line of the journal 5 and that of the crank pin 3, while the last recess is coaxial with the crank disk and the casing.

In this construction of the crank mechanism an adjustment of the eccentricity of the crank pin, i. e. of the crank stroke, can be obtained by simply bringing about a relative angular rotation between the continuously rotating crank disk 1 and the casing 9, for example by holding the preferably knurled outer surface of the casing 9 by hand, against the entraining force of the crank pin 3.

In fact, starting from the position according to Fig. 2, in which the crank pin lies in the outermost recess and is held therein by the action of the torsion spring 6 on the rocking member 4, so that it tries to take the casing along in the direction of rotation of the crank disk (counterclockwise), upon the casing being held by hand, the crank pin will leave the recess against this spring action and be guided by the adjacent cam face 13 to the following recess, into which it will snap resiliently, so that, upon the casing being released, the crank stroke— and consequently the rocking angle of the fan—will have gained a lower value.

If the casing is held by hand further, the adjustment is repeated and the crank pin reaches positions at successively decreasing radial distances, until it reaches the innermost coaxial recess, where the stroke is zero and the fan is stationary as regards its rocking motion.

If in this position the casing 9 is rotated in the same direction as disc 1 but somewhat faster, the crank pin is forced along with the action of the torsion spring from the central recess to a position intermediate the latter and the preceding recess, so that the stroke is slightly increased again. The crank pin can thus be successively adjusted to greater eccentricity again until the desired value has been reached, the maximum again being the position of 15 the drawing.

From this it therefore appears that for the adjustment the drive of the shaft 2 need not be interrupted, and that not a single fastening member need be disengaged or fastened again.

The crank mechanism here described can naturally be applied in all those cases where an adjustment of the magnitude of the crank stroke in both directions between a maximum and a lower value, if desired zero, is required. In the case where no complete elimination of the crank motion is necessary or desirable, the innermost recess will naturally not be provided centrally.

Figure 3:
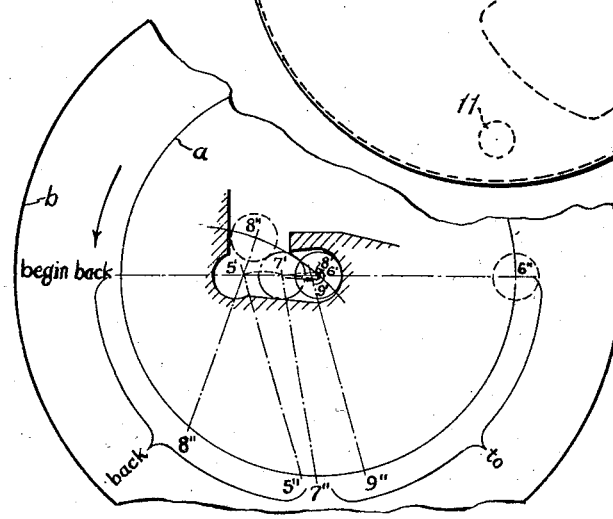

Referring to Fig. 3, a thin line circle a appears thereon and indicates the path of the pin 5 in a construction provided by the invention, while the relatively thick line circle b represents the outer periphery of the casing 9. If the casing 9 is maintained stationary, as by manually gripping the casing, the pin 5 travels around the circle a in the counter-clockwise direction, as indicated by the arrow in Fig. 3. Such counter-clockwise rotation of the pin 5 will cause the crank pin 3 to move from the position shown in Fig. 2 through the successive recesses 14 toward the center of the casing 9. In Fig. 3, the positions of the crank pin in the center recess and in the next adjacent recess are indicated by the numerals 6' and 5', respectively. The positions of the pin 5 on the circle a corresponding to the positions 5' and 6' of the crank pin are indicated by the numerals 5" and 6", respectively, on the circle a.

Figure 4:
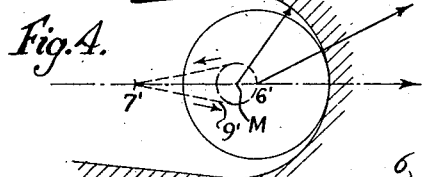
Figs. 3 and 4 illustrate the operation of the mechanism shown in Figs. 1 and 2.

It is apparent, both from Fig. 2, as well as from Figs. 3 and 4 that substantial clearance is provided between the crank pin 3 and the central recess when the crank pin is engaged in the latter. The crank pin 3 is disposed in position 6' thereof (Fig. 3) when it is located exactly at the center of the casing or support 9 so that the stroke of the connecting rod 12 (Fig. 1) is then equal to zero. The center of the central recess for pin 3 is at the point M (Fig. 4), and it is to be noted that the point M is radially spaced from the center of the crank disk 1 and the support or casing 9 and also from the center of the circle a defining the path of the pin 5, the center of the circle a being located exactly at the position 6'. Thus, it is apparent that pin 3 will arrive at position 6' thereof (Fig. 3) as soon as the pin 5 reaches the position 6" on the circle a, and that the dot-dash line extending from the position 6' of pin 3 and the position 6" of pin 5 passes through the point M. Further, referring to Fig. 3 of the sketch, it will be seen that the center of the pin 3 travels along a line which is curved in one direction from the position 5' to an intermediate position 7' between the positions 5' and 6', and that, in moving from the intermediate position 7' to the position 6', the center of the crank pin moves along a curved line which extends at the other side of the dot-dash line connecting the positions 6' of the crank pin and the position 6" of the pin 5. If the casing 9 is maintained stationary while the crank disk continues to rotate and carry along the pin 5, no movement of the center of the pin 3 in its position 6' will occur during the movement of the pin 5 through 180°. However, as soon as the pin 5 reaches the position indicated at "begin back" on Fig. 3, the springs 6 (Figs. 1 and 2) will urge the crank pin 3 towards the wall of the central recess opposite to the wall or guide face along which the crank pin entered the central recess from the intermediate position 7' to the central position 6'. Further relative rotation of the casing or support and the crank disk, for example, by maintaining the casing or support stationary, will cause the center of the crank pin 3 to move along said opposite wall or guide face of the central recess back towards the intermediate point 7' with the center of the pin 3 then moving in the direction indicated by the arrows in Fig. 4. The extent of the movement of the pin 5 along the circle a during the above described backward movement of the crank pin 3 is indicated by the bracket "back" in Fig. 3. Further backward movement of the crank pin 3 from the position 7' intermediate the positions 5' and 6' back to the position 5 which is the next adjacent recess to the central recess, is caused, not by keeping casing 9 stationary, but by rotating the latter in an opposite direction with respect to the rotation of the crank disk 1 and the pin 5.

It is to be noted that it is not necessary to change from maintaining the casing 9 stationary to rotating the latter in the direction opposite to the rotation of the crank disk immediately upon the arrival of the crank pin at the intermediate positions 7'. In the intermediate positions 7', the crank pin 3 fits almost exactly between the opposite walls or guide surfaces defining the slot leading into the central recess and, if the opposite rotation of casing 9 is commenced after the crank pin reaches the intermediate position 7', this will only result in the movement of the crank pin, during the extended period in which the casing is in a stationary condition, to the intermedate position 7' and then partially back to the central position 6'. However, if the opposite rotation of the casing or support 9 is begun as nearly as is possible as soon as the crank pin reaches the intermediate position 7' thereof, the crank pin will not tend to move partially back towards the position 6' thereof. As seen in Fig. 4, the path of the center of the crank pin 3 from the intermediate position 7' to the central position 6' and then back again is formed by two almost straight lines and by part of a small circle having its center at M and a radius which is equal to the distance from the point M to the position 6' of the pin, that is to the center of the entire device. Thus, if for example, the opposite rotation of the casing or support is only begun when the crank pin has moved back to the position 9' (Figs. 3 and 4), at which time the pin 5 is at the position 9" thereof on the circle a (Fig. 3), the center of the crank pin will then move from position 9' thereof back to position 7' and thereafter, in response to opposite rotation of the casing or support to the next adjacent position 5'.

Fig. 3 also shows that for one position 8" of the pin 5 on the circle a, the crank pin can be disposed in two positions, one of these positions being intermediate the position 5' of the crank pin and the next adjacent recess in the backward direction, while the other of these positions is intermediate the position 7' and the central position 6' during the backward movement of the crank pin from 6' to 7'.

What I claim is:

1. A variable-throw crank mechanism comprising a rotatable crank disk, a member mounted on said disk for rocking relative to the latter about an axis parallel to, and spaced from, the axis of rotation of said crank disk, a crank pin carried by said member parallel to, and spaced from, the rocking axis of said member, spring means continuously urging said member to rock in the direction radially away from said axis of the crank disk, and a support co-axially rotatable with respect to said crank disk and normally rotating with the latter, said support having a series of spaced apart recesses arranged in a spiral about the axis of said support and into which said crank pin is selectively urged by the action of said spring means, said support further having guide faces connecting the successive recesses of said series so that relative rotation of said crank disk and support causes said crank pin to move, against the action of said spring means, out of one of said recesses and into another of the recesses of said series, depending upon the extent of the relative rotation, thereby to vary the radial distance from said crank pin to the axis of said crank disk.

2. A variable-throw crank mechanism according to claim 1; wherein said support includes a disk portion having a cylindrical flange extending from the periphery thereof and surrounding said crank disk, and means on said flange frictionally engaging said crank disk to urge said support to rotate with the latter and limiting the relative axial movement of said crank disk and support.

3. A variable-throw crank mechanism according to claim 1; wherein the recess at one end of said spirally arranged series is located on the axis of said crank disk, and said crank pin is spaced from the rocking axis of said member by the distance between said axis of the crank disk and said rocking axis of the member.

4. A variable-throw crank mechanism according to claim 3; wherein said recesses and guide faces define an opening in said support, and wherein said recess at one end of the spirally arranged series is larger than said pin to provide clearance for the latter when engaged therein and forms part of a slot opening longitudinally towards the next adjacent recess.

References Cited in the file of this patent

UNITED STATES PATENTS

| 151,310 | Mouck | May 26, 1874 |
| 312,709 | De Valin | Feb. 24, 1885 |
| 873,649 | Allen et al. | Dec. 10, 1907 |
| 970,140 | Trowbridge | Sept. 13, 1910 |
| 1,563,669 | Snyder | Dec. 1, 1925 |

FOREIGN PATENTS

| 285,065 | Germany | June 22, 1915 |